US007873845B2

(12) United States Patent
Vetteth

(10) Patent No.: US 7,873,845 B2
(45) Date of Patent: Jan. 18, 2011

(54) CLASSIFICATION TECHNIQUE FOR POWERED DEVICES USING SELECTIVE FREQUENCY FILTERING

(75) Inventor: Anoop Vetteth, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 813 days.

(21) Appl. No.: 11/827,303

(22) Filed: Jul. 11, 2007

(65) Prior Publication Data

US 2009/0015237 A1 Jan. 15, 2009

(51) Int. Cl.
*G06F 1/26* (2006.01)
(52) U.S. Cl. ........................ 713/300; 713/310
(58) Field of Classification Search .......... 713/300; 336/181
See application file for complete search history.

(56) References Cited

U.S. PATENT DOCUMENTS

| 6,952,785 | B1 | 10/2005 | Diab et al. |
| 7,293,182 | B2 | 11/2007 | Diab et al. |
| 7,647,510 | B2* | 1/2010 | Landry et al. ............ 713/300 |

| 2005/0044431 | A1* | 2/2005 | Lang et al. ............ 713/300 |
| 2006/0057967 | A1 | 3/2006 | Shimada |

(Continued)

OTHER PUBLICATIONS

Wael Diab, Methods and Apparatus for Provisioning Uninterruptible Power for Power over Ethernet Applications, U.S. Appl. No. 11/021,151, filed Dec. 23, 2004.
Meilissa Lum, Method and Apparatus for Distributing Power to a Load in a Powered Device, U.S. Appl. No. 11/514,606, filed Sep. 1, 2006.

(Continued)

*Primary Examiner*—Nitin C Patel
(74) *Attorney, Agent, or Firm*—BainwoodHuang

(57) ABSTRACT

A method, performed by a power sourcing apparatus is provided. The method includes (a) providing an electronic signal to a powered device (PD) over a wire through a circuit device, the circuit device permitting current to flow at pre-determined frequencies, the pre-determined frequencies forming a first set of frequency components, (b) sensing the electronic signal over the wire to detect frequency components present in the electronic signal, the detected frequency components forming a second set of frequency components, and (c) classifying the electronic signal into one of a plurality of classes according to a pattern of frequency components present in the first and second sets. Apparatus for use in conjunction with the method are also provided.

19 Claims, 6 Drawing Sheets

U.S. PATENT DOCUMENTS

| | | |
|---|---|---|
| 2006/0078093 A1 | 4/2006 | Karam et al. |
| 2006/0092000 A1 | 5/2006 | Karam et al. |
| 2006/0149978 A1 | 7/2006 | Randall et al. |
| 2006/0273661 A1 | 12/2006 | Toebes et al. |
| 2006/0291405 A1 | 12/2006 | Karam |
| 2007/0019445 A1 | 1/2007 | Blaha et al. |
| 2007/0025452 A1 | 2/2007 | Schindler |
| 2007/0143636 A1* | 6/2007 | Bailey et al. ............... 713/300 |
| 2007/0170909 A1 | 7/2007 | Vorenkamp et al. |
| 2007/0206774 A1* | 9/2007 | Vorenkamp et al. ......... 379/310 |
| 2007/0220280 A1 | 9/2007 | Karam et al. |
| 2007/0296394 A1 | 12/2007 | Landry et al. |
| 2008/0005600 A1 | 1/2008 | Diab et al. |
| 2008/0005601 A1 | 1/2008 | Diab |
| 2008/0040625 A1 | 2/2008 | Vorenkamp et al. |

OTHER PUBLICATIONS

Roger Karam, Powered Communications Interface with DC Current Imbalance Compensation, U.S. Appl. No. 11/516,075, filed Sep. 6, 2006.

Roger Karam, et al., Advanced Classification Concept for Poeplus, U.S. Appl. No. 11/728,743, filed Mar. 27, 2007.

Frederick Schindler, Dynamic Current Limits, U.S. Appl. No. 11/937,254, filed Nov. 8, 2007.

* cited by examiner

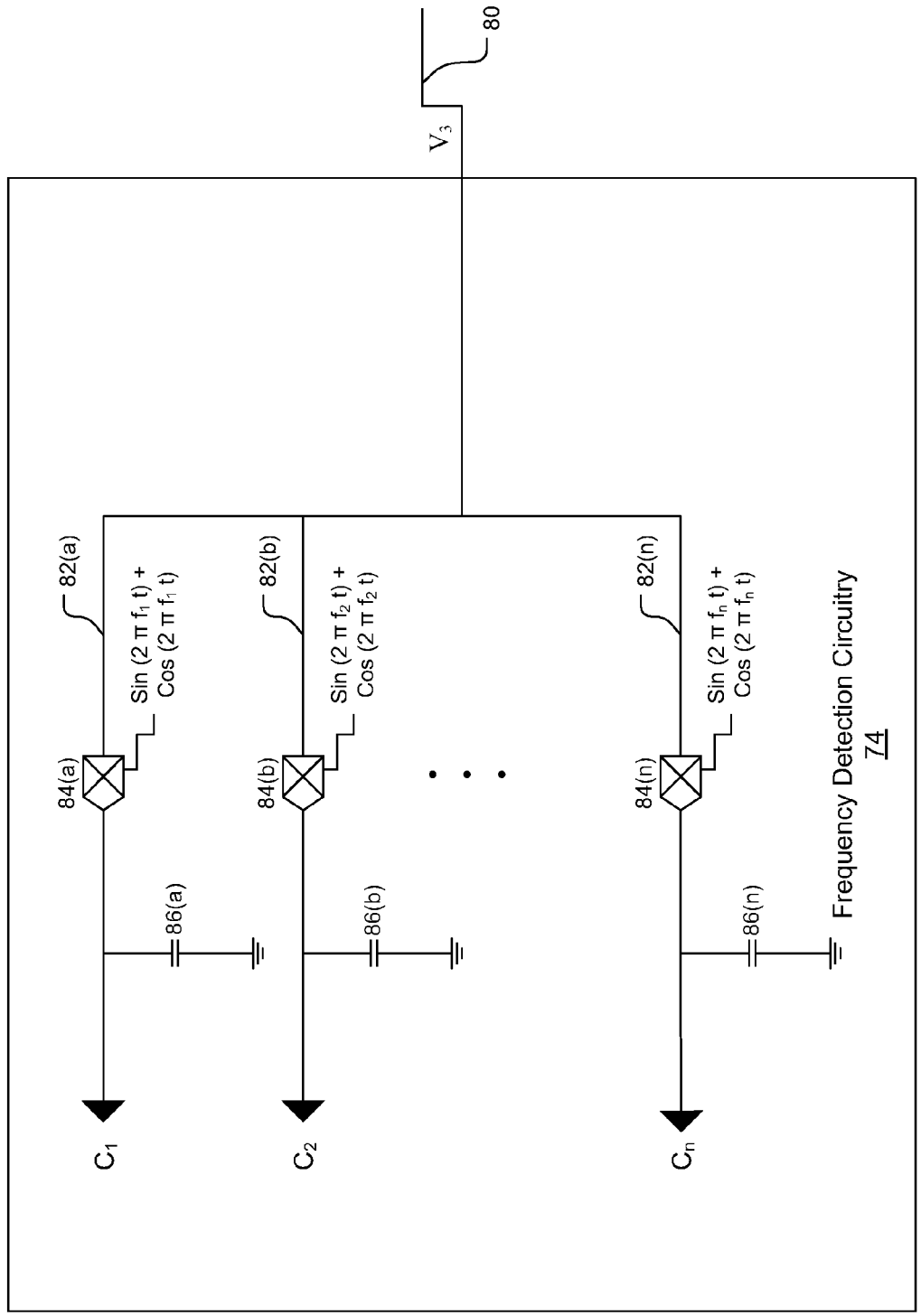

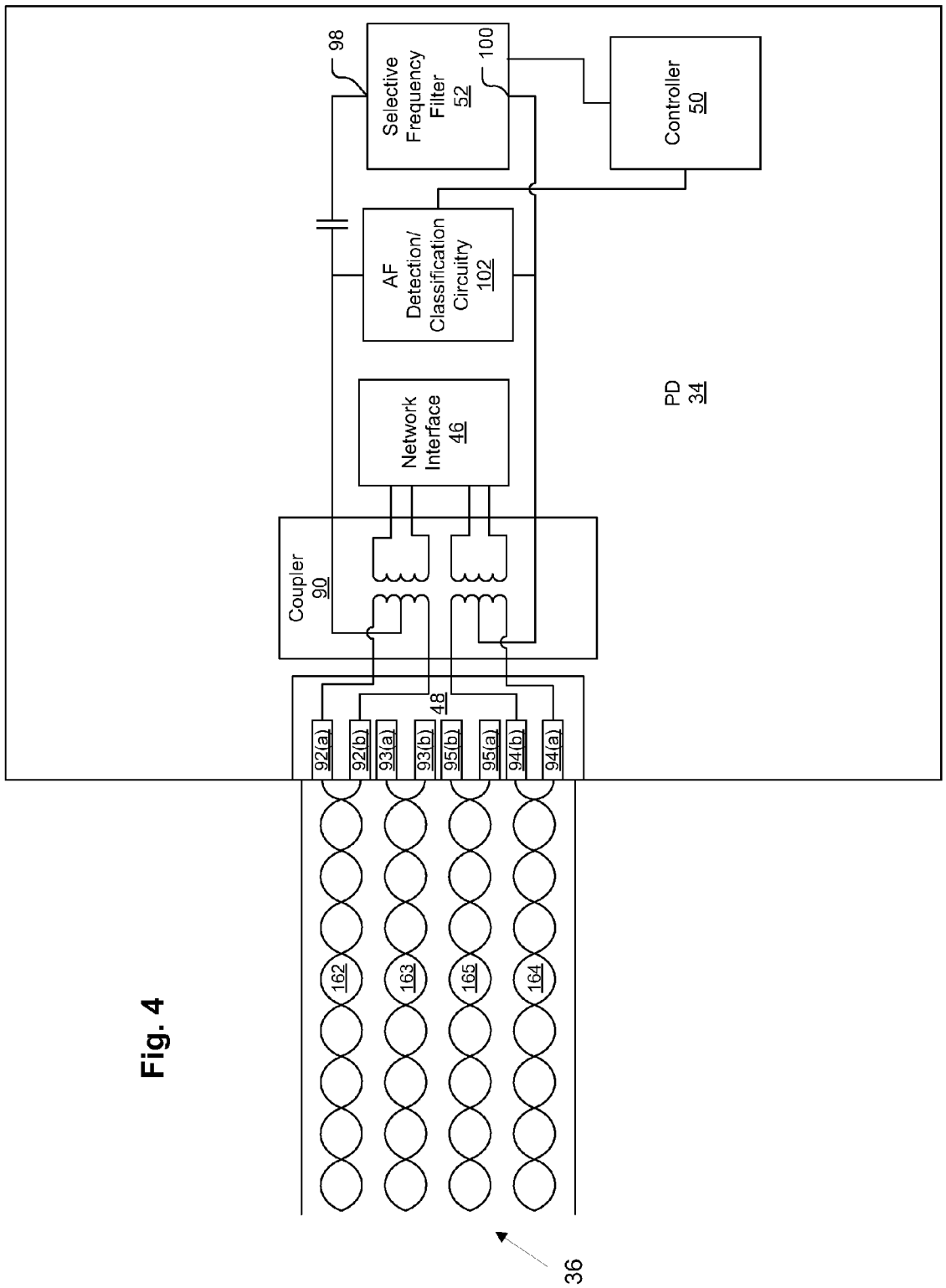

Class 110

Class 010

Class 000

Class 100

Class 111
AF PD

Class 011

Class 001

US 7,873,845 B2

CLASSIFICATION TECHNIQUE FOR POWERED DEVICES USING SELECTIVE FREQUENCY FILTERING

TECHNICAL FIELD

The present disclosure relates generally to computer networking and power provisioning.

BACKGROUND

A typical phantom (or inline) power communications system includes power-sourcing communications equipment and a set of remotely-powered network devices that connect to the power-sourcing communications equipment though a set of network cables. The power-sourcing communications equipment includes a power supply and transmit/receive circuitry. During operation, the power supply provides power to the remotely-powered network devices through the network cables, and the transmit/receive circuitry concurrently exchanges data with the remotely-powered network devices through the same network cables. Accordingly, the users of the remotely-powered network devices are not burdened with having to separately connect their devices to power sources (e.g., wall outlets). For example, the IEEE 802.3af standard, or the newer IEEE 802.3-2005 standard, which is also called the "Power over Ethernet" (PoE) standard, defines ways to build Ethernet power-sourcing equipment (PSE) and powered devices (PDs). In particular, the IEEE 802.3-2005 standard identifies ways to deliver 48 volts of Direct Current (DC) power (at up to 15.4 Watts) over unshielded twisted-pair wiring to a variety of Ethernet PDs, such as IP phones, wireless LAN access points, laptop computers and Web cameras. In accordance with the PoE standard, a PSE carries out an inline power detection process, and, if successful, an optional inline power classification process. The detection process attempts to identify a PoE-compatible PD by applying one or two DC voltages and determining if a 25K Ohm resistance is present on the line. The classification process is implemented by applying a set DC voltage and measuring the current drawn. The current drawn characterizes the PD as a member of one of a set of five PoE classes. Depending upon the class, up to a certain amount of inline power is allocated to that PD.

A new proposed standard, IEEE 802.3at, also referred to as PoE+, improves upon PoE by, inter alia, increasing the number of power classes. One way of performing the classification process under PoE+ to detect additional classes involves a repetitive classification technique, referred to as the ping pong technique. In this technique, a first PoE classification process is performed, followed by a second classification process. If the two classification processes yield different classes, then the PSE may determine that the PD is PoE+ compliant. Additional classes may be utilized by combining the results of the two classification processes and possibly further classification processes. A similar technique is described in U.S. Patent Application Publication No. 2006/0092000 (Karam, et al.), filed on Nov. 3, 2004, entitled, "POWERED DEVICE CLASSIFICATION IN A WIRED DATA TELECOMMUNICATIONS NETWORK."

BRIEF DESCRIPTION OF THE DRAWINGS

Objects, features, and advantages of particular embodiments of the invention will be apparent from the following description, as illustrated in the accompanying drawings in which like reference characters refer to the same parts throughout the different views. The drawings are not necessarily to scale, emphasis instead being placed upon illustrating the principles of various embodiments of the invention.

FIG. 3 illustrates example frequency-detection circuitry of a power sourcing apparatus of one embodiment in greater detail.

FIG. 4 illustrates an example embodiment of the internal configuration of a powered device of one embodiment.

DETAILED DESCRIPTION

Overview

A method for classifying powered devices is provided. The method includes (a) providing an electronic signal to a powered device (PD) over a wire through a circuit device, the circuit device permitting current to flow at pre-determined frequencies, the pre-determined frequencies forming a first set of frequency components, (b) sensing the electronic signal over the wire to detect frequency components present in the electronic signal, the detected frequency components forming a second set of frequency components, and (c) classifying the electronic signal into one of a plurality of classes according to a pattern of frequency components present in the first and second sets.

Apparatus for use in practicing the method are also described. These include a power-sourcing equipment apparatus and a PD apparatus.

Description of Example Embodiments

A new PoE+ classification technique involves selective frequency filtering of a classification signal having multiple frequency components.

Figure 1:
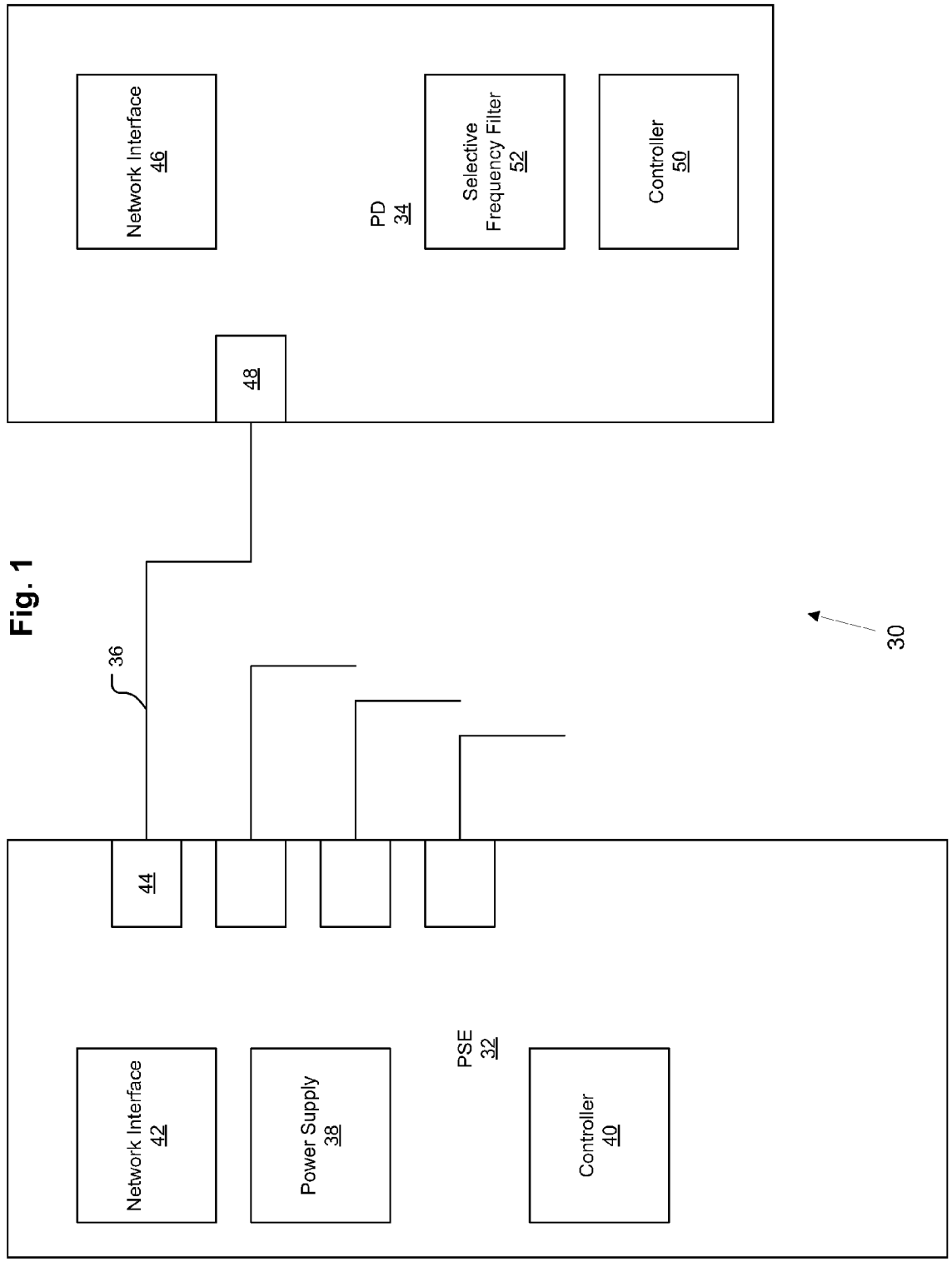
FIG. 1 illustrates an example system for use in practicing various embodiments.

FIG. 1 illustrates an example system 30 for use in practicing various embodiments. The system 30 includes a PSE 32, at least one PD 34 connected to the PSE 32 over an Ethernet cable 36. The PSE 32 includes a power supply 38, a controller 40, a network interface 42, and at least one powered Ethernet port 44. The PD 34 contains a network interface 46, a powered Ethernet port 48, a controller 50, and a selective frequency filter 52. The power supply 38 outputs voltage $V_O$.

Figure 2:
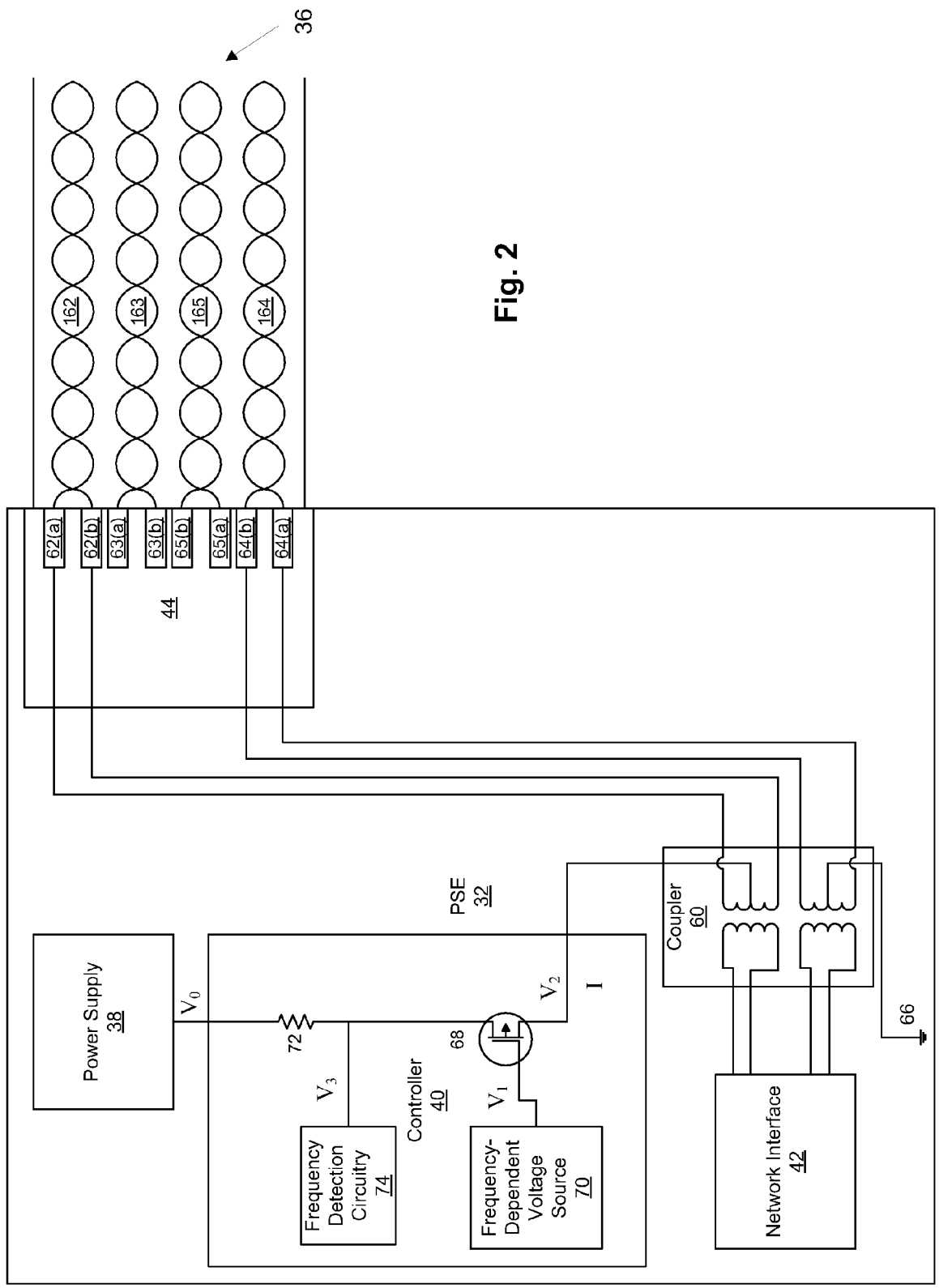
FIG. 2 illustrates an example embodiment of the internal configuration of a power sourcing apparatus of one embodiment.

FIG. 2 illustrates an example PSE 32 of one embodiment in further detail. The Ethernet port 44 couples to the network interface 42 via an optional coupler 60. In one embodiment, as depicted, the coupler 60 may include a transformer, allowing electrical isolation between the network interface 42 and the Ethernet port 44. Pins 62(a) and 62(b) of the Ethernet port 44 also couple to the controller 40, as depicted through the center-tap of a transformer of the coupler 60, pins 64(a) and 64(b) couple to ground 66, as depicted through the center-tap of a second transformer of the coupler 60. The connection to the controller 40 couples to a circuit device, in this case to the drain of a voltage-controlled transistor 68, such as, for example, a CMOS transistor. The gate of the transistor 68 couples to a frequency-dependent voltage source 70, while the source of the transistor 68 couples to a sense resistor 72, having resistance R, and frequency-detection circuitry 74.

The sense resistor 72 couples to the power supply 38. Ground 66 is also used for the power supply 38.

The frequency-dependent voltage source 70 outputs voltage $V_1$, where:

$$V_1 = v_{g-af} + \sum_{i=1}^{n} v_{g-i} \mathrm{Sin}(2\pi f_i t) \quad (1)$$

where $v_{g-af}$ is the voltage needed to generate a DC voltage of $v_{af}$ at the drain of the transistor 68, and $v_{g-i}$ is the voltage needed to generate a DC voltage of $v_i$ at the drain of the transistor 68. The symbols $v_{af}$, $v_{g-i}$, and $f_i$ will be defined below.

In one embodiment, the frequency-dependent voltage source 70 may include the Alternating Current (AC) generator often found in 802.3af-compliant AC disconnect circuitry. Such an AC generator will typically run at 500 Hz, and additional frequencies may be generated by taking harmonics of that frequency.

It should be understood that the PSE 32 may be implemented in various ways. In the embodiment shown, the network cable 36 contains 4 twisted pairs 162, 163, 164, 165, and two of those pairs 162, 164 are used to transmit data via the network interface 42, while two other pairs 163, 165 are unused. In the embodiment shown, the data transmission pairs 162, 164 are also used to transmit power. In an alternative embodiment, the unused pairs 163, 165 may be used to transmit power either instead of or in addition to the data transmission pairs 162, 164. In an alternative embodiment, all four pairs 162, 163, 164, 165 may be used for both data and power transmission.

FIG. 3 illustrates example frequency-detection circuitry 74 of one embodiment in further detail. An input line 80, having voltage $V_3$ is split into several signal lines 82(a), 82(b), ..., 82(n) (generally, signal lines 82). Each signal line 82 inputs into an analog multiplier 84 (depicted as analog multipliers 84(a), 84(b), ..., 84(n)). The second input of each multiplier is $\mathrm{Sin}(2\pi f_i t) + \mathrm{Cos}(2\pi f_i t)$, where i is 1 to n depending on which multiplier is attached, and t represents time. The output of each multiplier 84 inputs into one lead of a grounded capacitor 86 (depicted as capacitors 86(a), 86(b), ..., 86(n)). Each capacitor 86 smooths out the signal to produce binary signals $C_1, C_2, \ldots, C_n$.

FIG. 4 illustrates an example PD 34 of one embodiment in further detail. The Ethernet port 48 couples to the network interface 46 via an optional coupler 90. In one embodiment, as depicted, the coupler 90 may include a transformer, allowing electrical isolation between the network interface 46 and the Ethernet port 48. Pins 92(a) and 92(b) of the Ethernet port 48 also couple, as depicted through the center-tap of a transformer of the coupler 90, to a first terminal 98 of the selective frequency filter 52 after passing through a capacitor 96. Pins 94(a) and 94(b) couple, as depicted through the center-tap of a second transformer of the coupler 90, to a second terminal 100 of the selective frequency filter 52. In one embodiment, as depicted, pins 92(a), 92(b), 94(a), and 94(b) also couple to standard 802.3af-compliant detection and classification circuitry 102 in parallel to the connection to the selective frequency filter 52. The selective frequency filter 52 also couples to the controller 50. The selective frequency filter 52 may include one or more analog second order filters. In some embodiments, the selective frequency filter 52 contains tunable analog second order filters, functioning as band-pass filters, and is controlled by the controller 50. In other embodiments, the selective frequency filter 52 is pre-configured to contain a pre-tuned band-pass filter. In some embodiments, the 802.3af-compliant detection and classification circuitry 102 is controlled by the controller 50.

It should be understood that the PD 34 may be implemented in various ways. In the embodiment shown, the network cable 36 contains 4 twisted pairs 162, 163, 164, 165, and two of those pairs 162, 164 are used to transmit data via the network interface 42, while two other pairs 163, 165 are unused. In the embodiment shown, the data transmission pairs 162, 164 are also used to receive power. In an alternative embodiment, the unused pairs 163, 165 may be used to receive power either instead of or in addition to the data transmission pairs 162, 164. In an alternative embodiment, all four pairs 162, 163, 164, 165 may be used for both data and power transmission.

Figure 5C:
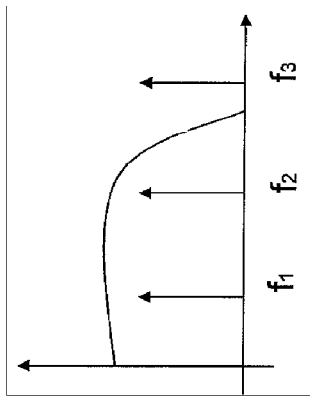
FIGS. 5A-5G illustrate a set of example frequency-responses of a selective frequency filter used in one embodiment.
Figure 5F:
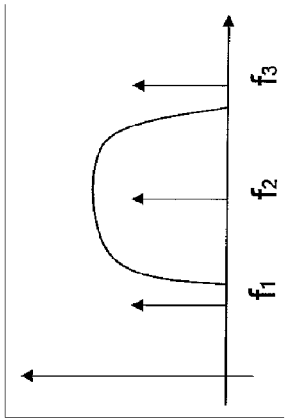
Figure 5B:
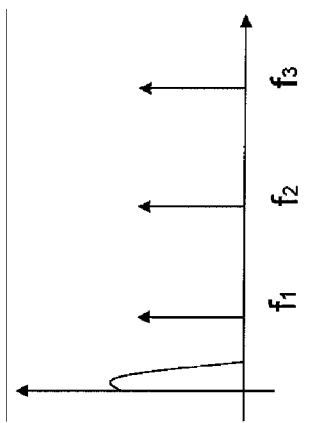
Figure 5E:
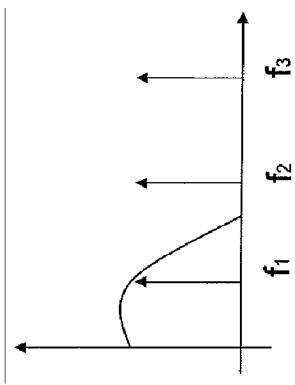
Figure 5A:
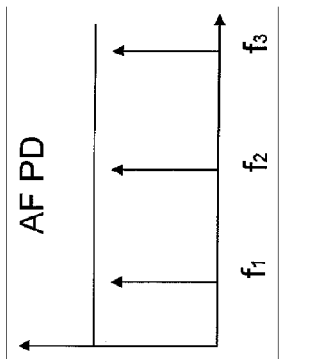
Figure 5D:
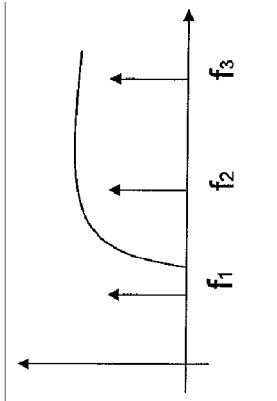
Figure 5G:
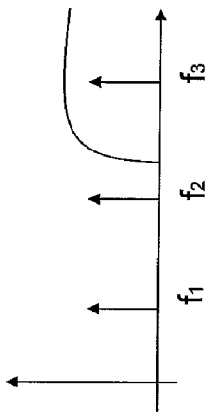

FIGS. 5A-5G illustrate classification by selective frequency filtering. In this example, 3 frequency components $f_1$, $f_2$, and $f_3$ are utilized (e.g., $f_1$=500 Hz, $f_2$=1000 Hz, and $f_3$=2000 Hz). In FIG. 5A, the selective frequency filter 52 has not filtered out any of the 3 frequencies; thus, this is class 111, and it represents a case in which the PD 34 is a legacy device not capable of selective frequency filtering. In such a case, the PSE 34 classifies the PD 34 purely according to the 802.3af classification. In FIG. 5B, all of the 3 frequencies are filtered out, yielding class 000. In FIGS. 5C and 5D, only one frequency component is filtered out, yielding classes 110 and 011 respectively. In FIGS. 5E, 5F, and 5G, 2 frequency components are filtered out, yielding classes 100, 010, and 001 respectively. Thus, using 3 frequency components, 6 classes may be defined. If this is combined with 802.3af classification, 4×6=24 classes are available. Note that class 111 is not counted because it represents the case in which the PD 34 is a legacy device. Also note that class 101 is not defined because using a band-pass filter, it is not possible to filter out 2 frequency components $f_1$ and $f_3$, while leaving an intervening frequency component $f_2$ unfiltered. In general, if n frequency components are used, then the number of definable classes is $$\frac{n(n+1)}{2}$$

while, if the technique is combined with the 802.3af classification technique, then 2n(n+1) classes are definable.

Figure 6:
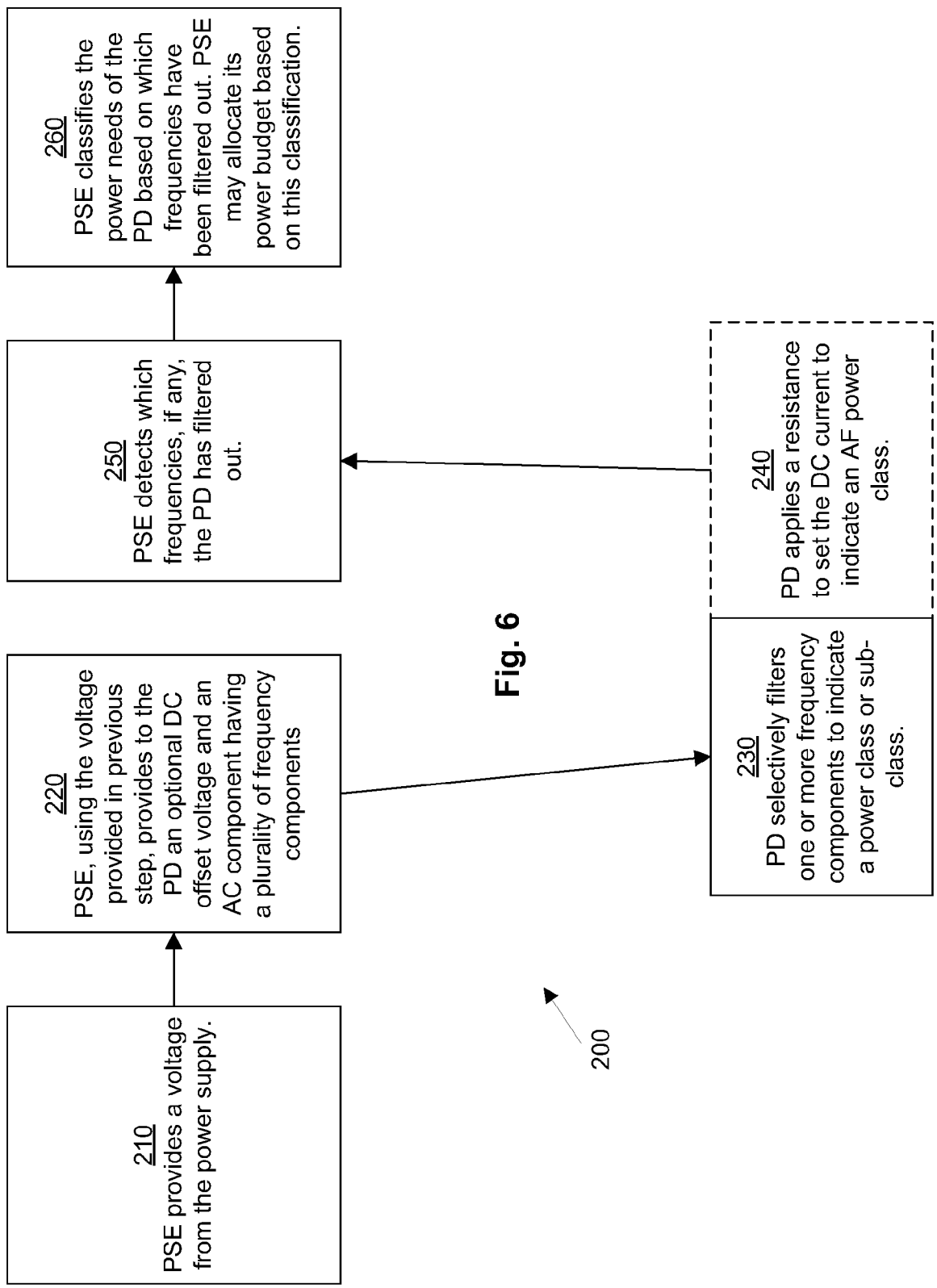
FIG. 6 illustrates a method in one embodiment.

FIG. 6 illustrates the method 200 of one embodiment. In step 210, the power supply 38 of the PSE 32 produces a voltage $V_0$ (e.g., 48 V).

In step 220, the frequency-dependent voltage source 70 of the PSE 32 provides a control voltage to the gate of transistor 68 in order to control the flow of electricity through transistor 68. As shown above in equation 1, this control voltage may include an offset voltage $v_{g-af}$ to induce a DC offset voltage $v_{af}$ at the drain of the transistor 68. In one embodiment $v_{af}$ is a classification voltage (e.g., within the range of 15-20 V, according to the 802.3af standard). In another embodiment, the DC offset voltage $v_{af}$ may be zero. The control voltage also includes a plurality of frequency components in order to generate voltages of $v_i$ at frequencies $f_i$ at the drain of transistor 68. Thus, aside from the DC offset, electricity will only pass through the transistor 68 at the plurality of frequencies $f_i$. Because the output of transistor 68 couples to pins 92(a) and 92(b) of powered Ethernet port 44, the classification voltage will be transmitted to the PD across network cable 36 (over wire pair 162) but only certain frequency components will be present in the signal. Thus wire pair 162 contains a DC classification voltage together with a superimposed AC voltage. The voltage at the drain of transistor 68 is $V_2$, where:

$$V_2 = v_{af} + \sum_{i=1}^{n} v_i \mathrm{Sin}(2\pi f_i t) \qquad (2)$$

In step 230, which may take place concurrently with optional step 240, the selective frequency filter 52 of the PD 34 receives the classification voltage provided by the PSE 32 in parallel with the optional 802.3af detection/classification circuitry 102. The selective frequency filter 52, as directed by the controller 50, selectively filters out one or more frequency components from the signal. By controlling which of the frequency components are filtered out, the controller can indicate a power class more finely than under 802.3af or 802.3-2005 standard classification. In one embodiment, one frequency component is always filtered out to indicate that the PD 34 is compliant with this technique. In one embodiment, 10 classes are provided, as in one draft of the upcoming 802.3at standard. In other embodiments, more or fewer classifications may be provided. In one embodiment, classification is effected by combining the legacy classification provided by the 802.3af detection/classification circuitry 102 (described below, in connection with optional step 240) with additional classification provided in step 230. Thus, for example, step 240 provides 4 power classes (since the fifth class—class 4—is reserved), so if 2 frequency components (say, components A and B) are used in step 230, a total of 12 classes are provided. This is because if neither A nor B is filtered (sub-class 11), that merely indicates that the PD 34 is compatible with this technique, so this step provides 3 sub-classes (01, 10, and 00). The 3 sub-classes multiples by the 4 classes from step 240 to yield 12 classes. In an alternative embodiment, classification is effected through step 230 alone, ignoring any result from step 240 (which may or may not be performed at all). For example, if 4 frequency components are used, then 10 classes are provided. Additional detail with respect to classification by selective frequency filtering is provided below.

Due to the frequency filtering and 802.3af classification done at the PD 34, the current at the drain of transistor 68 is I, where:

$$I = I_{af} + \sum_{i=1}^{n} A_i I_i \mathrm{Sin}(2\pi f_i t + \Phi) \qquad (3)$$

where $\phi$ is an offset due to the response time of the selective frequency filter 52. $A_i \in \{1,0\}$ where, $A_i$ is 1 if frequency component $f_i$ is not present in the signal, or 0 if frequency component $f_i$ is present.

In optional step 240, which may take place concurrently with step 230, the optional 802.3af detection/classification circuitry 102 of the PD 34 receives the transmitted voltage and applies a resistance to indicate one of the five 802.3af power classes. Note, however, that the fifth class (class 4) is reserved, so only 4 classes may be used. For example, if the PD requires between 0.44 and 3.84 W of power, the 802.3af detection/classification circuitry 102 applies a resistance to ensure that 10.5 mA of current (indicating class 1) flow through the circuit back to the PSE 32. As an additional example, if the PD requires between 6.49 and 12.95 W of power, the 802.3af detection/classification circuitry 102 applies a resistance to ensure that 28 mA of current (indicating class 3) flow through the circuit back to the PSE 32. The controller 50 of the PD 34 may direct the 802.3af detection/classification circuitry 102 what amount of resistance to provide based on the power needs of the device as determined by or programmed into the controller 50. This optional step 240 ensures that the PD 34 is capable of working with a legacy 802.3af or 802.3-2005 PoE PSE 32. It may also allow additional classes to be utilized in combination with the classes provided by step 230, as described above.

In step 250, the frequency detection circuitry 74 of the controller 40 of the PSE 32 detects which frequencies the PD 34 has filtered out. The voltage of the signal input 80 into the frequency detection circuitry 74 is $V_3$:

$$V_3 = V_0 - IR \qquad (4)$$

so:

$$V_3 = v_{R-af} + \sum_{i=1}^{n} A_i v_{R-i} \mathrm{Sin}(2\pi f_i t + \Phi) \qquad (5)$$

where $V_3$ is dependent on the resistance R of the sense resistor 72.

In the embodiment depicted in FIG. 3, the detection of which frequencies the PD 34 has filtered out is done by splitting the signal into several portions, one signal portion corresponding to each frequency component generated by the PSE 32 (designated $f_1, f_2, \ldots, f_n$ where there are n frequency components). Each signal portion then passes through an analog multiplier 84. For each frequency component i, the multiplier generates $\mathrm{Sin}(2\pi f_i t) + \mathrm{Cos}(2\pi f_i t)$. The result of this multiplication, as is well-understood in the art, will be a periodic function having a zero average if the signal having voltage $V_3$ has a non-zero component $f_i$. Otherwise, the output will have a non-zero average. The capacitor 86 serves to average the output of the multiplier 84. The output, due to the capacitor, will thus be a binary signal $C_i$, where $C_i$ is 1 if frequency component $f_i$ is not present in the signal, or 0 if frequency component $f_i$ is present.

In step 260, the PSE 32 determines how to classify the PD 34 based on the binary signals $C_i$. This is done by concatenating the negation of signals $C_i$ for i=1 to n, thus yielding a class number (e.g., 100) as described above in connection with FIG. 5. Based on the classification, power is allocated in the PSE 32 power budget to the PD 34. Such power allocation is well-understood in the art.

While FIG. 6 illustrates the classification stage of one embodiment, it should be understood that the apparatuses as described in the figures are also capable of performing PoE and PoE+ detection. Thus, the PSE 32 initially provides two voltages (both within the range of 2.7 to 10 V) in series according to the PoE standard, and the 802.3af detection/classification circuitry 102 of the PD 34 provides a 25 KOhm resistance to indicate that a PoE PD 32 has been attached to a port 44 of the PSE 32. Upon recognizing the PD 34, the PSE 32 only then initiates the power classification stage, as described above.

Thus, new PoE+ classification techniques involving selective frequency filtering of a classification signal having multiple frequency components have been provided. Apparatus for these techniques has also been provided.

While various embodiments of the invention have been particularly shown and described, it will be understood by those skilled in the art that various changes in form and details may be made therein without departing from the spirit and scope of the invention as defined by the appended claims.

For example, while the frequency detection circuitry 74 of the controller 40 of the PSE 32 has been described and depicted as using analog circuitry, such as analog multipliers and capacitors, other kinds of frequency detection circuitry may be used instead. For example, the voltage $V_3$ of the signal input into the frequency detection circuitry may be digitized, and a digital signal processor or similar mechanism may be used to perform a Fourier transform of the digitized signal. In such a case, the unfiltered frequency components will be readily detectable by reference to the result of the Fourier transform.

As an additional example, the new classification techniques have been described as sending frequency components across twisted pairs 162 and 164. However, in some embodiments, the frequency components are instead sent over twisted pairs 163 and 165, while in yet other embodiments, the frequency components are sent over all 4 twisted pairs 163-165.

As an additional example, the new classification techniques have been described as being performed over PoE and PoE+ systems using Ethernet. However, the techniques are not limited to PoE, PoE+, or to Ethernet. Thus, the new classification techniques using selective frequency filtering may be used to classify equipment other than PDs over a link other than Ethernet.

What is claimed is:

1. A method comprising:
   providing an electronic signal to a powered device (PD) over a wire through a circuit device, the circuit device permitting current to flow at pre-determined frequencies, the pre-determined frequencies forming a first set of frequency components;
   sensing the electronic signal over the wire to detect frequency components present in the electronic signal, the detected frequency components forming a second set of frequency components; and
   classifying the electronic signal into one of a plurality of classes according to a pattern of frequency components present in the first and second sets;
   wherein providing the electronic signal to the PD over the wire through the circuit device includes providing a time-varying voltage to the gate of a voltage-controlled transistor, the source of the transistor being coupled to a power source, and the drain of the transistor being coupled to the PD.

2. A method as in claim 1 wherein:
   the electronic signal includes a direct current (DC) component having a DC current; and
   classifying includes further classifying the electronic signal according to the DC current.

3. A method as in claim 2 wherein:
   the PD is a Power over Ethernet (PoE) compliant PD; and
   the method further comprises:
       determining, by detecting if the first set and the second set are the same, if the PD is a legacy PoE device or a newer device capable of selectively filtering frequency components.

4. A method as in claim 2 wherein the method further comprises:
   providing power to the PD according to the class of the plurality of classes that the electronic signal is classified into.

5. A method as in claim 1 wherein the method further comprises:
   providing power to the PD according to the class of the plurality of classes that the electronic signal is classified into.

6. A method as in claim 1 wherein:
   the first set includes a plurality of frequency components;
   the second set contains fewer frequency components than the first set; and
   classifying the electronic signal includes:
       classifying the electronic signal into a first class of the plurality of classes when a specific frequency component from the first set is not found within the second set; and
       classifying the electronic signal into a second class of the plurality of classes when the specific frequency component from the first set is found within the second set.

7. An apparatus comprising:
   a power supply;
   a network interface; and
   a controller, the controller being configured to:
       provide an electronic signal to the network interface from the power supply through a circuit device, the circuit device permitting current to flow at pre-determined frequencies, the pre-determined frequencies forming a first set of frequency components;
       sense an electronic signal passing across the network interface to detect the frequency components present in the electronic signal, the detected frequency components forming a second set of frequency components; and
       classify the electronic signal into one of a plurality of classes according to a pattern of frequency components present in the first and second sets;
   wherein:
       the circuit device includes a voltage-controlled transistor, the source of the transistor coupled to the power supply and the drain of the transistor coupled to the network interface; and
       the controller, when providing the electronic signal to the network interface from the power supply through the circuit device, is configured to provide a voltage to the gate of the transistor which varies at the specified frequencies.

8. An apparatus as in claim 7 wherein:
   the electronic signal includes a direct current (DC) component having a DC current; and
   the controller is configured, when classifying the electronic signal, to further classify the electronic signal according to the DC current.

9. An apparatus as in claim 8 wherein:
   the apparatus is Power Over Ethernet (PoE) compliant power-sourcing equipment (PSE);
   the network interface is coupled to a PoE compliant powered device (PD); and
   the controller is further configured to:
       determine, by detecting if the first set and the second set are the same, if the PD is a legacy PoE device or a newer device capable of selectively filtering frequency components.

10. An apparatus as in claim 9 wherein the controller is further configured to:
    provide power to the PD over the network interface from the power supply according to the class of the plurality of classes that the electronic signal is classified into.

11. An apparatus as in claim 7 wherein the controller is further configured to:
    provide power to the network interface from the power supply according to the class of the plurality of classes that the electronic signal is classified into.

12. An apparatus as in claim 7 wherein:
    the apparatus further comprises an alternating current (AC) generator; and
    the controller, when providing a voltage to the gate of the transistor which varies at the specified frequencies, is configured to generate the voltage variations with an AC signal generated by the AC generator and one or more additional AC signals that are harmonics of the first AC signal.

13. An apparatus as in claim 12 wherein the AC generator provides an AC signal for use in implementing an AC disconnect feature.

14. An apparatus as in claim 7 wherein
the first set includes a plurality of frequency components;
the second set contains fewer frequency components than the first set; and
the controller, when classifying the electronic signal, is configured to:
classify the electronic signal into a first class of the plurality of classes when a specific frequency component from the first set is not found within the second set; and
classify the electronic signal into a second class of the plurality of classes when the specific frequency component from the first set is found within the second set.

15. An apparatus comprising:
a network interface;
an electronic load, having a power requirement; and
a selective frequency filter, the selective frequency filter being configured to:
receive an electronic signal from the network interface;
filter out one or more frequencies present in the electronic signal to create a pattern of frequency components which indicates the power requirement; and
provide the filtered electronic signal to the network interface;
wherein the selective frequency filter, when filtering out one or more frequencies, is configured to provide a frequency-dependent resistance to block passage of current at the filtered frequencies.

16. An apparatus as in claim 15 wherein the apparatus further comprises:
a controller, the controller being configured to determine the power requirement for the apparatus.

17. An apparatus as in claim 16 wherein:
the controller is configured to periodically recalculate the power requirement; and
the selective frequency filter is further configured to periodically filter out one or more frequencies present in the electronic signal to create a pattern which indicates a recalculated power requirement.

18. An apparatus as in claim 15 wherein the apparatus is a Power over Ethernet (PoE) compliant powered device.

19. An apparatus as in claim 18 wherein the apparatus is configured to couple, via the network interface, to PoE compliant power-sourcing equipment.

* * * * *